United States Patent
Bunker (10) Patent No.: US 8,533,949 B2
(45) Date of Patent: Sep. 17, 2013

(54) METHODS OF MANUFACTURE FOR COMPONENTS WITH COOLING CHANNELS

(75) Inventor: Ronald Scott Bunker, Waterford, NY (US)

(73) Assignee: General Electric Company, Niskayuna, NY (US)

( * ) Notice: Subject to any disclaimer, the term of this patent is extended or adjusted under 35 U.S.C. 154(b) by 60 days.

(21) Appl. No.: 13/026,595

(22) Filed: Feb. 14, 2011

(65) Prior Publication Data
US 2012/0207953 A1 Aug. 16, 2012

(51) Int. Cl.
*B21D 53/78* (2006.01)
*B21K 3/04* (2006.01)
*B23P 15/02* (2006.01)

(52) U.S. Cl.
USPC ................ 29/889.721; 29/889.7; 29/889.72; 415/115; 415/116

(58) Field of Classification Search
USPC ............... 29/889.721–889.722; 415/115, 415/116, 173.1, 173.4, 178, 200
See application file for complete search history.

(56) References Cited

U.S. PATENT DOCUMENTS

| | | | |
|---|---|---|---|
| 2,641,439 A * | 6/1953 | Williams | 416/90 R |
| 5,626,462 A | 5/1997 | Jackson et al. | |
| 5,640,767 A * | 6/1997 | Jackson et al. | 29/889.721 |
| 5,820,337 A * | 10/1998 | Jackson et al. | 415/200 |
| 5,875,549 A | 3/1999 | McKinley | |
| 6,214,248 B1 | 4/2001 | Browning et al. | |
| 6,234,755 B1 | 5/2001 | Bunker et al. | |
| 6,321,449 B2 | 11/2001 | Zhao et al. | |
| 6,368,060 B1 | 4/2002 | Fehrenbach et al. | |
| 6,412,541 B2 | 7/2002 | Roesler et al. | |
| 6,551,061 B2 | 4/2003 | Darolia et al. | |
| 6,582,194 B1 | 6/2003 | Birkner et al. | |
| 6,602,053 B2 | 8/2003 | Subramanian et al. | |
| 6,617,003 B1 | 9/2003 | Lee et al. | |
| 6,905,302 B2 * | 6/2005 | Lee et al. | 415/115 |
| 6,921,014 B2 | 7/2005 | Hasz et al. | |
| 7,014,923 B2 | 3/2006 | Schnell et al. | |
| 7,094,475 B2 | 8/2006 | Schnell et al. | |
| 7,186,167 B2 | 3/2007 | Joslin | |
| 7,302,990 B2 | 12/2007 | Bunker et al. | |
| 7,744,348 B2 | 6/2010 | Bezencon et al. | |
| 2010/0080688 A1 | 4/2010 | Bezencon et al. | |

FOREIGN PATENT DOCUMENTS
EP 1387040 B1 4/2004

OTHER PUBLICATIONS
R.S. Bunker et al., "Turbine Components With Cooling Features and Methods of Manufacturing the Same," U.S. Appl. No. 12/953,177, filed Nov. 23, 2010, G.E.

(Continued)

Primary Examiner — Richard Chang
(74) Attorney, Agent, or Firm — Penny A. Clarke (57) ABSTRACT

A method of manufacturing a component is provided. The method includes forming one or more grooves in an outer surface of a substrate. Each groove extends at least partially along the surface of the substrate and has a base, a top and at least one discharge point. The method further includes forming a run-out region adjacent to the discharge point for each groove and disposing a coating over at least a portion of the surface of the substrate. The groove(s) and the coating define one or more channels for cooling the component. Components with cooling channels are also provided.

22 Claims, 7 Drawing Sheets

(56) References Cited

OTHER PUBLICATIONS

D.G. Hyams et al., "A Detailed Analysis of film Cooling Physics: Part III—Streamwise Injection With Shaped Holes," Journal of Turbomachinery, vol. 122, Issue 1, Jan. 2000, pp. 122-132.

B. Wei et al., "Curved Electrode and Electrochemical Machining Method and Assembly Employing the Same," U.S. Appl. No. 12/562,568, filed Sep. 18, 2009.

W. Zhang et al., Process and System for Forming Shaped Air Holes, U.S. Appl. No. 12/697,005, filed Jan. 29, 2010.

B.P. Lacy et al., "Hot Gas Path Component Cooling System," U.S. Appl. No. 12/765,372, filed Apr. 22, 2010.

B. Lacy et a., "Articles Which Include Chevron Film Cooling Holes, and Related Processes," U.S. Appl. No. 12/690,675, filed May 28, 2010.

J.E.J. Lambie et al., "An overview on micro-meso manufacturing techniques for micro-eat exchangers for turbine blade cooling," International Journal Manufacturing Research, vol. 3, No. 1, 2008, pp. 3-26.

R.S. Bunker et al., "Components With Re-Entrant Shaped Cooling Channels and Methods of Manufacture," U.S. Appl. No. 12/943,624, filed Nov. 10, 2010, G.E.

R.S. Bunker et al., "Component and Methods of Fabricating and Coating a Component," U.S. Appl. No. 12/943,646, filed Nov. 10, 2010, G.E.

R.S.Bunker et al., "Method of Fabricating a Component Using a Fugitive Coating," U.S. Appl. No. 12/943,563, filed Nov. 10, 2010, G.E.

R.S. Bunker et al., "Components With Cooling Channels and Methods of Manufacture," U.S. Appl. No. 12/965,083, filed Dec. 10, 2010, G.E.

\* cited by examiner

METHODS OF MANUFACTURE FOR COMPONENTS WITH COOLING CHANNELS

BACKGROUND

The invention relates generally to gas turbine engines, and, more specifically, to micro-channel cooling therein.

In a gas turbine engine, air is pressurized in a compressor and mixed with fuel in a combustor for generating hot combustion gases. Energy is extracted from the gases in a high pressure turbine (HPT), which powers the compressor, and in a low pressure turbine (LPT), which powers a fan in a turbofan aircraft engine application, or powers an external shaft for marine and industrial applications.

Engine efficiency increases with temperature of combustion gases. However, the combustion gases heat the various components along their flowpath, which in turn requires cooling thereof to achieve a long engine lifetime. Typically, the hot gas path components are cooled by bleeding air from the compressor. This cooling process reduces engine efficiency, as the bled air is not used in the combustion process.

Gas turbine engine cooling art is mature and includes numerous patents for various aspects of cooling circuits and features in the various hot gas path components. For example, the combustor includes radially outer and inner liners, which require cooling during operation. Turbine nozzles include hollow vanes supported between outer and inner bands, which also require cooling. Turbine rotor blades are hollow and typically include cooling circuits therein, with the blades being surrounded by turbine shrouds, which also require cooling. The hot combustion gases are discharged through an exhaust which may also be lined, and suitably cooled.

In all of these exemplary gas turbine engine components, thin metal walls of high strength superalloy metals are typically used for enhanced durability while minimizing the need for cooling thereof. Various cooling circuits and features are tailored for these individual components in their corresponding environments in the engine. For example, a series of internal cooling passages, or serpentines, may be formed in a hot gas path component. A cooling fluid may be provided to the serpentines from a plenum, and the cooling fluid may flow through the passages, cooling the hot gas path component substrate and coatings. However, this cooling strategy typically results in comparatively low heat transfer rates and non-uniform component temperature profiles.

Micro-channel cooling has the potential to significantly reduce cooling requirements by placing the cooling as close as possible to the heated region, thus reducing the temperature difference between the hot side and cold side of the main load bearing substrate material for a given heat transfer rate. Currently, cooling is provided by means of film holes that are drilled through the entire substrate wall to the airfoil interior. However, processes for forming film holes can be labor intensive, time consuming and hence relatively expensive. In addition, it may be difficult to adapt film holes for use with micro-channel cooling because of dimensional constraints.

It would therefore be desirable to provide a method for forming film holes to allow coolant to exit cooling channels that overcomes these and other issues.

BRIEF DESCRIPTION

One aspect of the present invention resides in a method of manufacturing a component. The method includes forming one or more grooves in an outer surface of a substrate. Each groove extends at least partially along the surface of the substrate and has a base, a top and at least one discharge point. The method further includes forming a run-out region adjacent to the respective discharge point for each groove and disposing a coating over at least a portion of the surface of the substrate. The groove(s) and the coating define one or more channels for cooling the component.

Another aspect of the present invention resides in a component that includes a substrate comprising an outer surface and an inner surface. The outer surface defines one or more grooves and one or more run-out regions. Each groove extends at least partially along the outer surface of the substrate and has a base and at least one discharge point. Each run-out region is adjacent to the respective discharge point for a respective groove. The component further includes a coating disposed over at least a portion of the outer surface of the substrate, such that the groove(s) and the coating together define one or more channels for cooling the component.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The terms "first," "second," and the like, herein do not denote any order, quantity, or importance, but rather are used to distinguish one element from another. The terms "a" and "an" herein do not denote a limitation of quantity, but rather denote the presence of at least one of the referenced items.

The modifier "about" used in connection with a quantity is inclusive of the stated value, and has the meaning dictated by context, (e.g., includes the degree of error associated with measurement of the particular quantity). In addition, the term "combination" is inclusive of blends, mixtures, alloys, reaction products, and the like.

Moreover, in this specification, the suffix "(s)" is usually intended to include both the singular and the plural of the term that it modifies, thereby including one or more of that term (e.g., "the passage hole" may include one or more passage holes, unless otherwise specified). Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. In addition, it is to be understood that the described inventive features may be combined in any suitable manner in the various embodiments.

Figure 1:
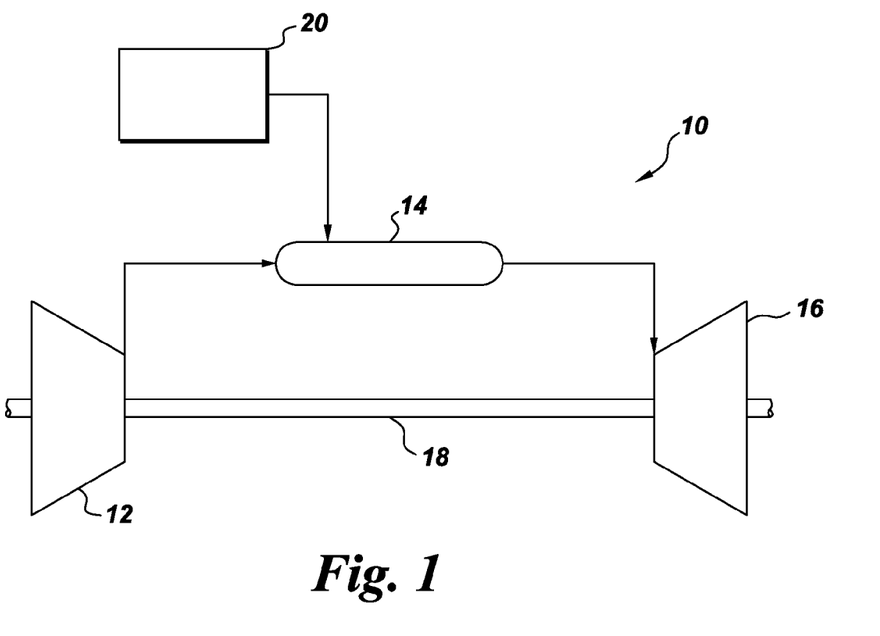
FIG. 1 is a schematic illustration of a gas turbine system.

FIG. 1 is a schematic diagram of a gas turbine system 10. The system 10 may include one or more compressors 12, combustors 14, turbines 16, and fuel nozzles 20. The compressor 12 and turbine 16 may be coupled by one or more shaft 18. The shaft 18 may be a single shaft or multiple shaft segments coupled together to form shaft 18.

The gas turbine system 10 may include a number of hot gas path components 100. A hot gas path component is any component of the system 10 that is at least partially exposed to a high temperature flow of gas through the system 10. For example, bucket assemblies (also known as blades or blade assemblies), nozzle assemblies (also known as vanes or vane assemblies), shroud assemblies, transition pieces, retaining rings, and compressor exhaust components are all hot gas path components. However, it should be understood that the hot gas path component 100 of the present invention is not limited to the above examples, but may be any component that is at least partially exposed to a high temperature flow of gas. Further, it should be understood that the hot gas path component 100 of the present disclosure is not limited to components in gas turbine systems 10, but may be any piece of machinery or component thereof that may be exposed to high temperature flows.

When a hot gas path component 100 is exposed to a hot gas flow 80, the hot gas path component 100 is heated by the hot gas flow 80 and may reach a temperature at which the hot gas path component 100 fails. Thus, in order to allow system 10 to operate with hot gas flow 80 at a high temperature, increasing the efficiency and performance of the system 10, a cooling system for the hot gas path component 100 is required.

In general, the cooling system of the present disclosure includes a series of small channels, or micro-channels, formed in the surface of the hot gas path component 100. For industrial sized power generating turbine components, "small" or "micro" channel dimensions would encompass approximate depths and widths in the range of 0.25 mm to 1.5 mm, while for aviation sized turbine components channel dimensions would encompass approximate depths and widths in the range of 0.15 mm to 0.5 mm. The hot gas path component may be provided with a cover layer. A cooling fluid may be provided to the channels from a plenum, and the cooling fluid may flow through the channels, cooling the cover layer.

Figure 3:
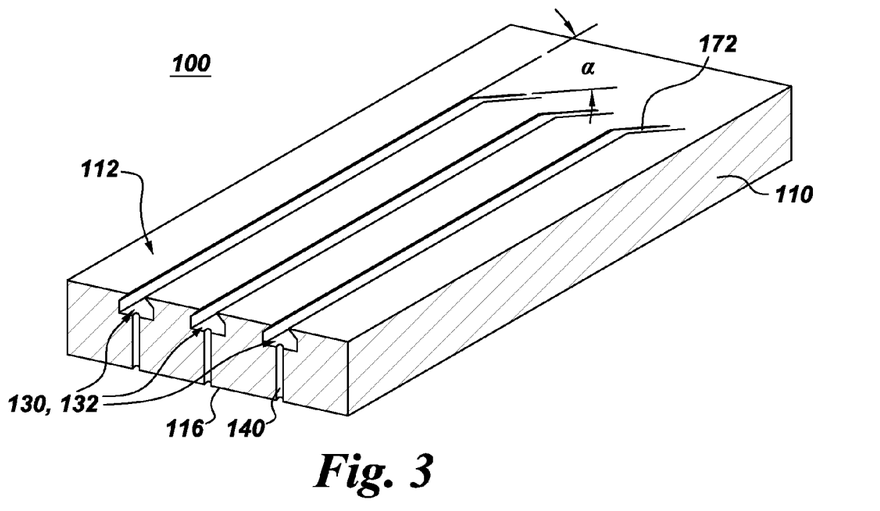
FIG. 3 schematically depicts, in perspective view, three example cooling channels that extend partially along the outer surface of a substrate and channel coolant to respective run-out regions formed in the outer surface of the substrate.
Figure 4:
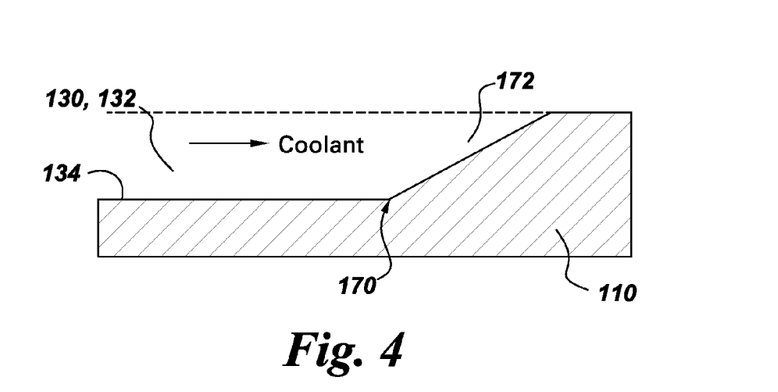
FIG. 4 is a cross-sectional view of one of the example cooling channels of FIG. 3 and shows the channel conveying coolant to a tapered, run-out region formed at a discharge point of the cooling channel.

A method of fabricating a component 100 is described with reference to FIGS. 2-20. As indicated, for example, in FIGS. 3 and 9, the component fabrication method includes, forming one or more grooves 132 in an outer surface 112 of a substrate 110. As indicated in FIGS. 3 and 4, for example, each groove 132 extends at least partially along the surface 112 of the substrate 110 and has a base 134, a top 136 and at least one discharge point 170. For the example configuration shown in FIGS. 3 and 4, each of the grooves 132 has a single discharge point 170, and for the example arrangement shown in FIG. 20, each of the grooves 132 has multiple discharge points 170. For the example arrangement shown in FIG. 2, the substrate 110 has at least one hollow interior space 114.

The substrate 110 is typically cast prior to forming grooves 132 and run-out regions 172 in the outer surface 112 of the substrate 110. As discussed in commonly assigned U.S. Pat. No. 5,626,462, Melvin R. Jackson et al., "Double-Wall Airfoil," which is incorporated by reference herein in its entirety, substrate 110 may be formed from any suitable material. Depending on the intended application for component 100, this could include Ni-base, Co-base and Fe-base superalloys. The Ni-base superalloys may be those containing both γ and γ' phases, particularly those Ni-base superalloys containing both γ and γ' phases wherein the γ' phase occupies at least 40% by volume of the superalloy. Such alloys are known to be advantageous because of a combination of desirable properties including high temperature strength and high temperature creep resistance. The substrate material may also comprise a NiAl intermetallic alloy, as these alloys are also known to possess a combination of superior properties including high temperature strength and high temperature creep resistance that are advantageous for use in turbine engine applications used for aircraft. In the case of Nb-base alloys, coated Nb-base alloys having superior oxidation resistance will be preferred, particularly those alloys comprising Nb-(27-40)Ti-(4.5-10.5)Al-(4.5-7.9)Cr-(1.5-5.5)Hf-(0-6)V, where the composition ranges are in atom per cent. The substrate material may also comprise a Nb-base alloy that contains at least one secondary phase, such as a Nb-containing intermetallic compound comprising a silicide, carbide or boride. Such alloys are composites of a ductile phase (i.e., the Nb-base alloy) and a strengthening phase (i.e., a Nb-containing intermetallic compound). For other arrangements, the substrate material comprises a molybdenum based alloy, such as alloys based on molybdenum (solid solution) with $Mo_5SiB_2$ and $Mo_3Si$ second phases. For other configurations, the substrate material comprises a ceramic matrix composite, such as a silicon carbide (SiC) matrix reinforced with SiC fibers. For other configurations the substrate material comprises a TiAl-based intermetallic compound.

Figure 5:
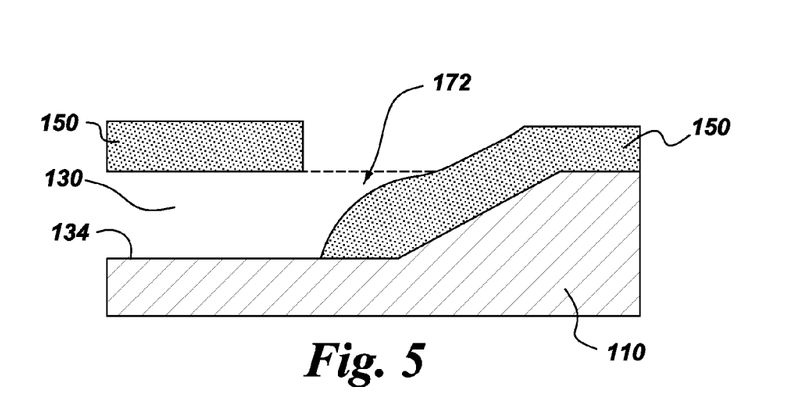
FIG. 5 shows the example cooling channels of FIG. 4 with a coating applied.
Figure 16:
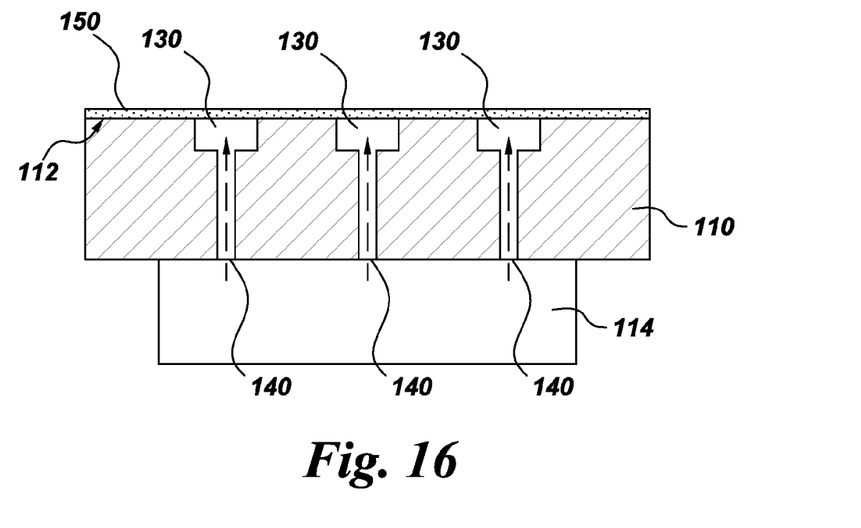

As indicated, for example, in FIGS. 3 and 4, the component fabrication method further includes forming a run-out region 172 adjacent to each discharge point 170 for each groove 132. It should be noted that although the illustrated run-out region has a flat surface, the run-out need not be a flat surface. On the contrary, the run-out region may be curved. As shown in FIGS. 5 and 16, for example, the component fabrication method further includes disposing a coating 150 over at least a portion of the outer surface 112 of the substrate 110. As indicated, for example, in FIG. 5, the one or more grooves 132 and the coating 150 define one or more channels 130 for cooling the component 100. Although the grooves are shown as having straight walls, the grooves 132 can have any configuration, for example, they may be straight, curved, or have multiple curves. In addition, for the example arrangement shown in FIG. 20, the component fabrication method further includes forming one or more additional run-out regions 172 for each groove 132. Beneficially, multiple run-out region arrangements, such as that shown in FIG. 20, may conveniently be located and formed off of any cooling channel, with the local orientation as desired, and exit shaping to provide enhanced film effectiveness.

Figure 20:
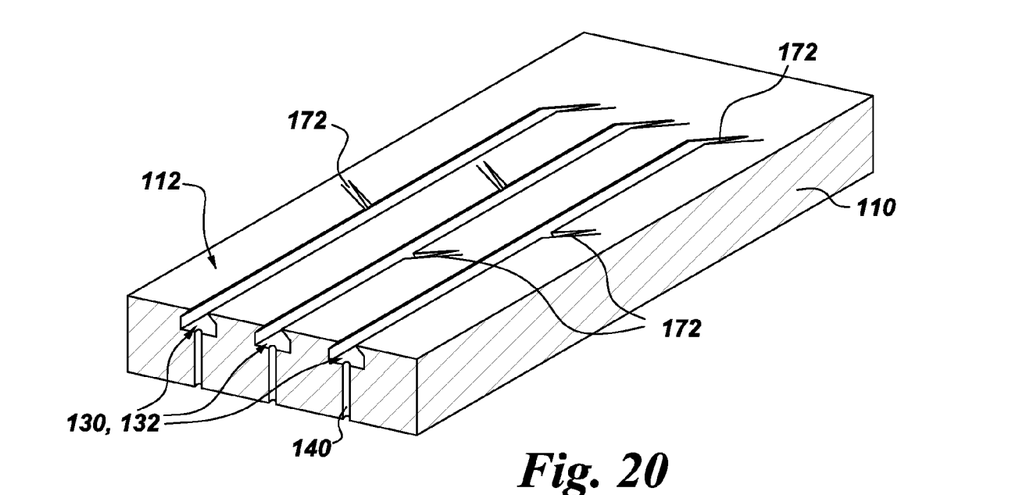
FIG. 20 schematically depicts, in perspective view, three example cooling channels with multiple run-out regions.

For the example arrangements illustrated in FIGS. 3 and 20, the channels 130 channel the cooling flow from the respective access hole 140 to the exiting film hole (shown as run-out region 172 in FIGS. 3 and 20). Typically, the channel length is in the range of 10 to 1000 times the film hole diameter, and more particularly, in the range of 20 to 100 times the film hole diameter. Beneficially, the channels 130 can be used anywhere on the surfaces of the components (airfoil body, lead edges, trail edges, blade tips, endwalls, platforms). In addition, although the channels are shown as having straight walls, the channels 130 can have any configuration, for example, they may be straight, curved, or have multiple curves, etc. Coating 150 comprises a suitable material and is bonded to the airfoil-shaped outer surface 120 of substrate 110. For particular configurations, the coating 150 has a thickness in the range of 0.1-2.0 millimeters, and more particularly, in the range of 0.1 to 1 millimeters, and still more particularly 0.1 to 0.5 millimeters for industrial components. For aviation components, this range is typically 0.1 to 0.25 millimeters. However, other thicknesses may be utilised depending on the requirements for a particular component 100.

The coating 150 comprises structural coating layers and may further include optional additional coating layer(s). The coating layer(s) may be deposited using a variety of techniques. For particular processes, the structural coating layer(s) are deposited by performing an ion plasma deposition (cathodic arc). Example ion plasma deposition apparatus and method are provided in commonly assigned, US Published Patent Application No. 20080138529, Weaver et al, "Method and apparatus for cathodic arc ion plasma deposition," which is incorporated by reference herein in its entirety. Briefly, ion plasma deposition comprises placing a cathode formed of a coating material into a vacuum environment within a vacuum chamber, providing a substrate 110 within the vacuum environment, supplying a current to the cathode to form a cathodic arc upon a cathode surface resulting in arc-induced erosion of coating material from the cathode surface, and depositing the coating material from the cathode upon the substrate surface 112.

Non-limiting examples of a coating deposited using ion plasma deposition include structural coatings, as well as bond coatings and oxidation-resistant coatings, as discussed in greater detail below with reference to U.S. Pat. No. 5,626,462. For certain hot gas path components 100, the structural coating comprises a nickel-based or cobalt-based alloy, and more particularly comprises a superalloy or a (NiCo)CrAlY alloy. For example, where the substrate material is a Ni-base superalloy containing both $\gamma$ and $\gamma'$ phases, structural coating may comprise similar compositions of materials, as discussed in greater detail below with reference to U.S. Pat. No. 5,626,462.

For other process configurations, the structural coating is deposited by performing at least one of a thermal spray process and a cold spray process. For example, the thermal spray process may comprise combustion spraying or plasma spraying, the combustion spraying may comprise high velocity oxygen fuel spraying (HVOF) or high velocity air fuel spraying (HVAF), and the plasma spraying may comprise atmospheric (such as air or inert gas) plasma spray, or low pressure plasma spray (LPPS, which is also know as vacuum plasma spray or VPS). In one non-limiting example, a NiCrAlY coating is deposited by HVOF or HVAF. Other example techniques for depositing the structural coating include, without limitation, sputtering, electron beam physical vapor deposition, electroless plating, and electroplating.

For certain configurations, it is desirable to employ multiple deposition techniques for depositing structural and optional additional coating layers. For example, a first structural coating layer may be deposited using an ion plasma deposition, and a subsequently deposited layer and optional additional layers (not shown) may be deposited using other techniques, such as a combustion spray process or a plasma spray process. Depending on the materials used, the use of different deposition techniques for the coating layers may provide benefits in properties, such as, but not restricted to strain tolerance, strength, adhesion, and/or ductility.

The grooves 132 and run-out regions 172 may be formed using a variety of techniques. For example, the grooves 132 and run-out regions 172 may be formed using one or more of an abrasive liquid jet, plunge electrochemical machining (ECM), electric discharge machining with a spinning single point electrode (milling EDM), and laser machining (laser drilling). Example laser machining techniques are described in commonly assigned, U.S. patent application Ser. No. 12/697,005, "Process and system for forming shaped air holes" filed Jan. 29, 2010, which is incorporated by reference herein in its entirety. Example EDM techniques are described in commonly assigned U.S. patent application Ser. No. 12/790,675, "Articles which include chevron film cooling holes, and related processes," filed May 28, 2010, which is incorporated by reference herein in its entirety.

Figure 9:
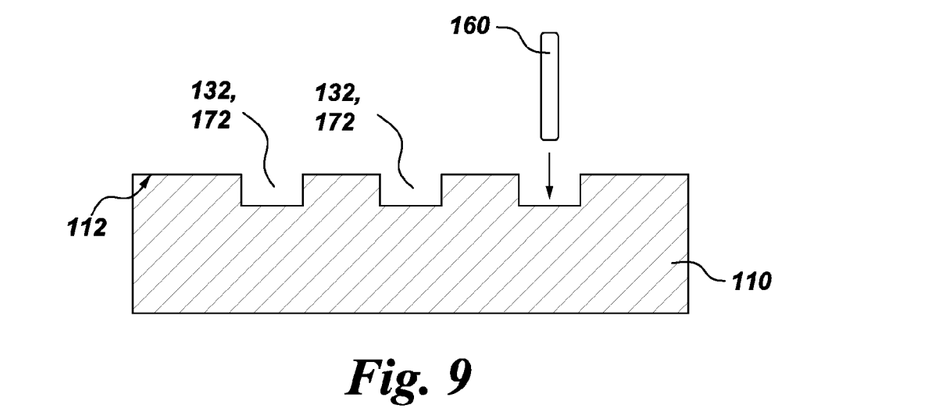
FIG. 9 schematically depicts the formation of three example grooves or run-out regions in an outer surface of a substrate, using an abrasive liquid jet.
Figure 10:
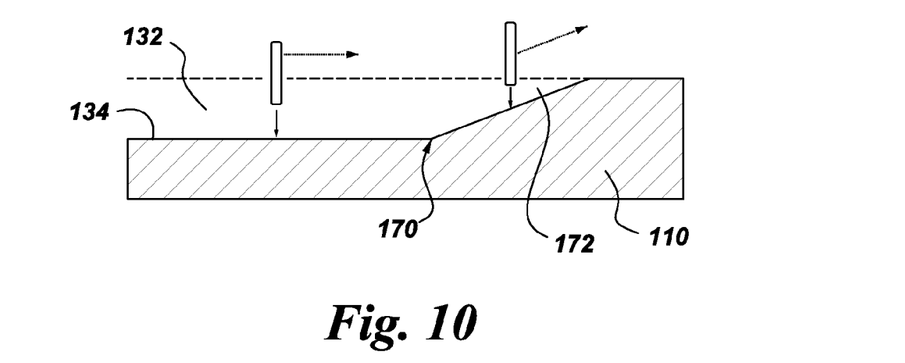
FIG. 10 schematically depicts example tooling paths for forming a groove and a tapered, run-out region at the discharge end of the groove.

For particular process configurations, the grooves 132 and run-out regions 172 are formed by directing an abrasive liquid jet 160 at the outer surface 112 of the substrate 110, as schematically depicted in FIGS. 9 and 10. For other process configurations, the run-out regions 172 may be formed by other means, such as milling EDM (EDM with a spinning, single point electrode). For the particular configuration shown in FIG. 10, the run-out region 172 is formed by lifting the abrasive liquid jet 160 from the outer surface 112 of the substrate 110, such that the run-out region 172 is tapered. For example, a beveled or angled shaped edge of the film discharge can be formed in the flow direction portion of the exit, such that coolant is diffused only in the most beneficial direction relative the external hot gases. Such a downstream shaped edge might be formed by letting the abrasive jet run out as it is lifted off the surface. Example water jet drilling processes and systems are provided in U.S. patent application Ser. No. 12/790,675. As explained in U.S. patent application Ser. No. 12/790,675, the water jet process typically utilizes a high-velocity stream of abrasive particles (e.g., abrasive "grit"), suspended in a stream of high pressure water. The pressure of the water may vary considerably, but is often in the range of about 35-620 MPa. A number of abrasive materials can be used, such as garnet, aluminum oxide, silicon carbide, and glass beads.

In addition, and as explained in U.S. patent application Ser. No. 12/790,675, the water jet system can include a multi-axis computer numerically controlled (CNC) unit. The CNC systems themselves are known in the art, and described, for example, in U.S. Patent Publication 2005/0013926 (S. Rutkowski et al), which is incorporated herein by reference. CNC systems allow movement of the cutting tool along a number of X, Y, and Z axes, as well as rotational axes.

Figure 13:
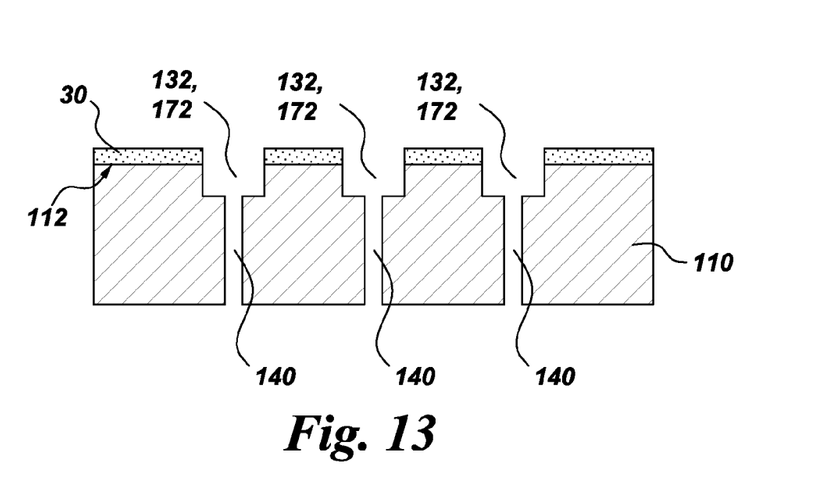
Figure 19:
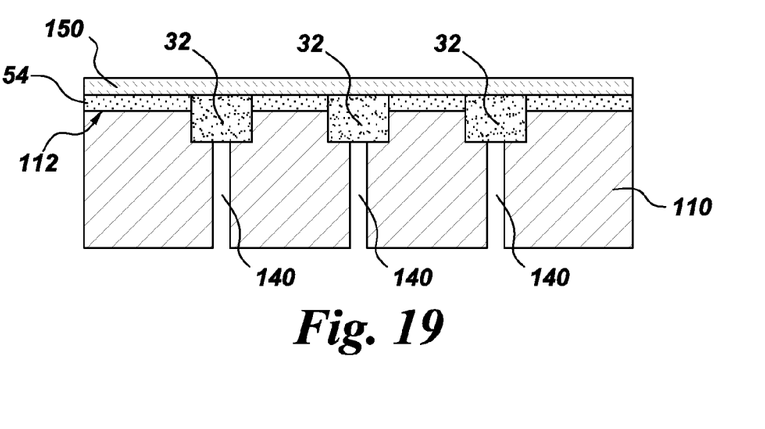

For the example processes shown in FIGS. 13, 16 and 19, the component fabrication method further includes forming one or more access holes 140 through the base 134 of a respective one of the grooves 132 to provide fluid communication between the grooves 132 and the hollow interior space(s) 114. The access holes 140 are formed prior to depositing the coating 150. The access holes 140 are typically circular or oval in cross-section and may be formed, for example using on or more of laser machining (laser drilling), abrasive liquid jet, electric discharge machining (EDM) and electron beam drilling. The access holes 140 may be normal to the base 134 of the respective grooves 132 (as shown in FIGS. 13, 16 and 19) or, more generally, may be drilled at angles in a range of 20-90 degrees relative to the base 134 of the groove.

Figure 6:
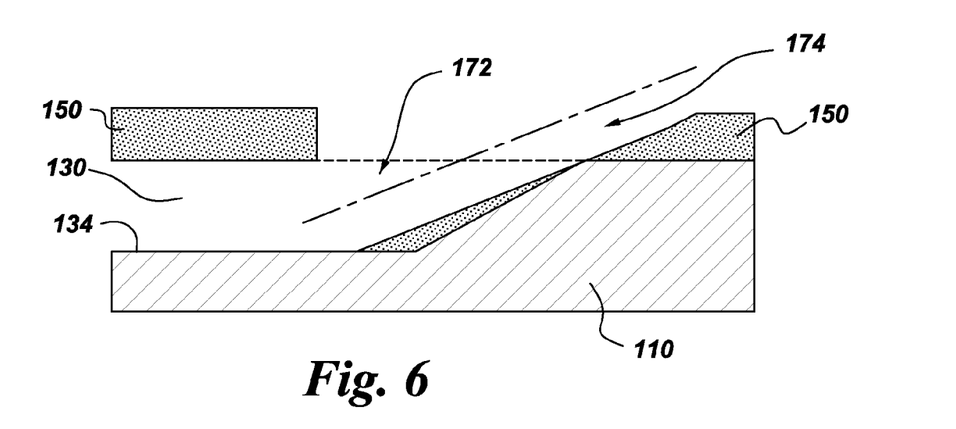
FIG. 6 shows the example cooling channel of FIG. 5 with a film hole formed in the run-out region by removal of a portion of the coating in the run-out region.

For particular arrangements, the run-out regions 172 are designed to be sufficiently wide, so that the coating 150 does not bridge the run-out regions 172. For the example arrangements shown in top view in FIGS. 7 and 8, the run-out region (indicated by footprint 176 in FIGS. 7 and 8) is wider than the respective groove (indicated by channel 130 in FIGS. 7 and 8). For the example configuration shown in FIG. 5, the coating 150 does not bridge the run-out region 172, such that the run-out region 172 forms a film hole (indicated by reference numeral 174 in FIG. 6) for the respective groove 132. More generally, the opening in the coating within the run-out region locates the film hole site, which can then be relatively simply machined to form the film hole. For the example arrangement shown in FIGS. 5 and 6, a portion of the coating 150 is deposited in the run-out region 172, and the component fabrication method further includes removing at least a portion of the coating 150 deposited in the run-out region 172, such that the run-out region 172 forms a film hole 174 for the respective groove 132. The film holes 174 may be round or non-circular shaped holes. Non-limiting examples of material removal techniques applicable for forming the film hole 174 include using an abrasive liquid jet or laser. Beneficially, this technique provides an economical means for forming the film holes.

For the arrangement shown in FIG. 3, the grooves 132 are re-entrant shaped. That is, the base 134 of each groove is wider than the top 136. For particular configurations, the run-out regions 172 are not re-entrant shaped. For the arrangement shown in FIG. 7, the run-out region 172 is wider than the top 136 of the respective groove 132. For particular arrangements, the coating 150 does not bridge the run-out region(s) 172, such that each run-out region 172 forms a film hole 174 (FIG. 6) for the respective groove 132. Re-entrant grooves 132 are discussed in commonly assigned, U.S. patent application Ser. No. 12/943,624, Bunker et al., "Components with re-entrant shaped cooling channels and methods of manufacture," which is incorporated by reference herein in its entirety. As described in U.S. patent application Ser. No. 12/943,624, to facilitate the deposition of coating 150 over the groove 132 without having the coating fill the groove 132, it is desirable to have the base 134 of the groove 132 be considerable larger than the top 136 of the groove. This also permits the formation of a sufficiently large channel 130 to meet the cooling requirements for the component 100. For particular configurations, the base 134 of a respective one of the re-entrant shaped grooves 132 is at least 2 times wider than the top 136 of the respective groove 132. For example, if the base 134 of the groove 132 is 0.75 millimeters, the top 136 would be less than 0.375 millimeters in width, for this configuration. For more particular configurations, the base 134 of the respective re-entrant shaped groove 132 is at least 3 times wider than the top 136 of the respective groove 132, and still more particularly, the base 134 of the respective re-entrant shaped groove 132 is in a range of about 3-4 times wider than the top 136 of the respective groove 132. Beneficially, a large base to top ratio increases the overall cooling volume for the micro-channel 130, while facilitating the deposition of the coating 150 over the groove 132 without having the coating 150 fill the groove 132.

Beneficially, by forming re-entrant grooves 132, it is not necessary to use a sacrificial filler (not shown) to apply coating 150 to the substrate 110. This eliminates the need for a filling process and for the more difficult removal process. By forming re-entrant shaped grooves with narrow openings 136 (tops), for example with openings 136 in the range of about 10-12 mils wide, the openings 136 can be bridged by the coating 150 without the use of a sacrificial filler, thereby eliminating two of the main processing steps (filling and leaching) for conventional channel forming techniques. As discussed in U.S. patent application Ser. No. 12/943,624, with reference to FIGS. 7 and 11 thereof and as discussed in greater detail below, for certain configurations, the coating 150 completely bridges the respective grooves 132, such that the coating 150 seals the respective cooling channels 130. For other arrangements, the coating 150 defines one or more porous gaps (also termed "permeable slots"), for example, porosity in the coating 150 or a gap in the coating, such that the coating 150 does not completely bridge each of the respective grooves 132.

In addition, by forming re-entrant shaped grooves 132 and run-out regions 172 that are not re-entrant shaped, where the run-out region 172 is wider than the top 136 of the respective groove 132 (FIG. 7), the coating 150 can bridge the groove 132 (either completely or partially) while the coating 150 does not bridge the run-out region(s) 172, such that each run-out region 172 forms a film hole 174 (FIG. 6) for the respective groove 132. For other arrangements, the re-entrant shape may be retained in part right up to and through the run-out length. In this case, an abrasive liquid jet or laser is typically applied, in order to clean up the run-out end and form the desired film exit after coating.

Figure 11:
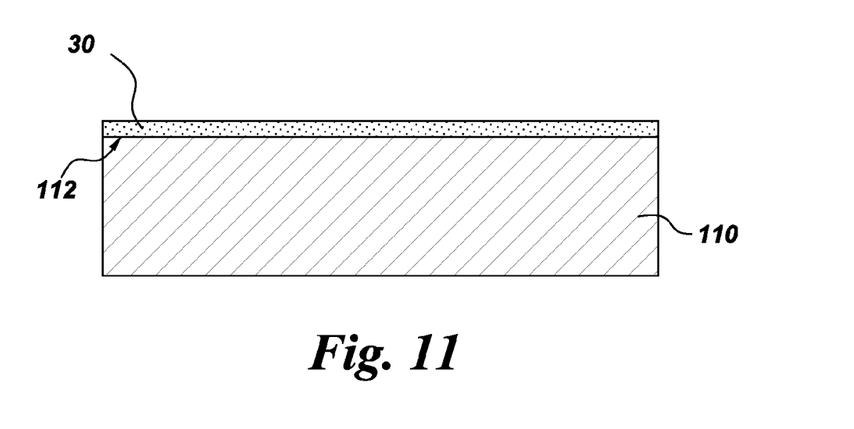
FIGS. 11-16 schematically illustrate a method of forming the grooves and the run-out regions using a fugitive coating and a sacrificial filler.
Figure 12:
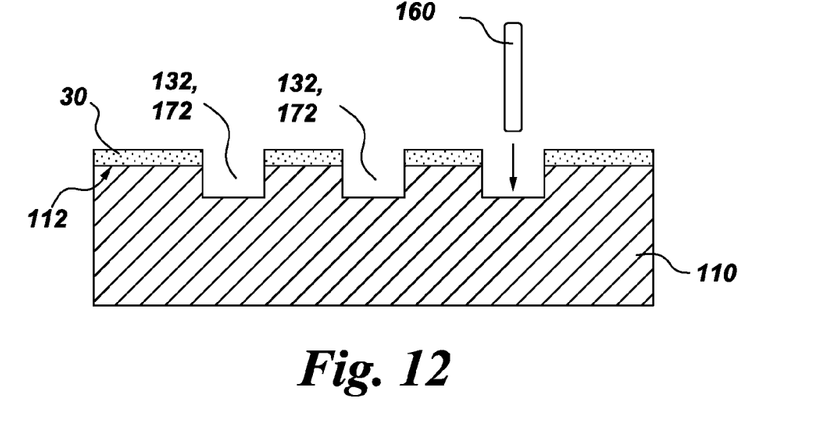
Figure 14:
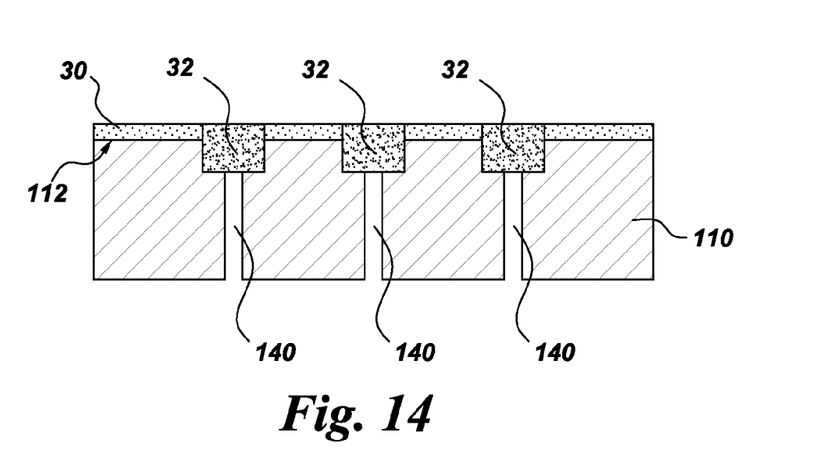
Figure 15:
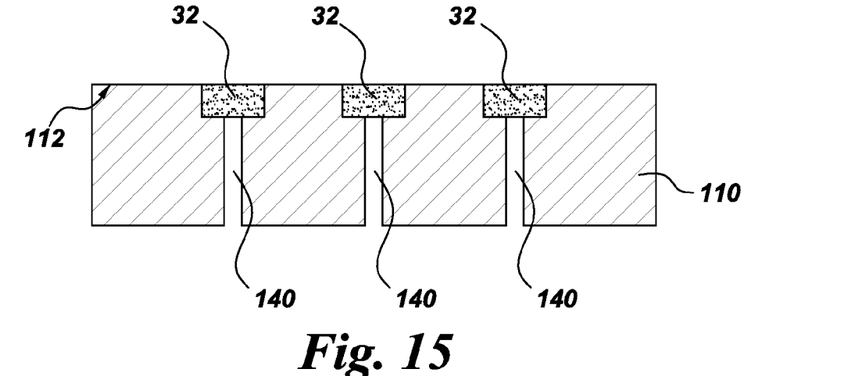

FIGS. 11-16 schematically illustrate a method of forming the grooves 132 and the run-out regions using a fugitive coating and a sacrificial filler. Although the run-out regions are not expressly shown, the method illustrated in FIGS. 11-16, may be used to form the run-out regions. For the illustrated process, the component fabrication method further includes depositing a fugitive coating 30 on the outer surface 112 of the substrate 110, as indicated in FIG. 11. As indicated in FIGS. 11 and 12, the fugitive coating 30 is deposited prior to forming the groove(s) 132. As indicated in FIG. 12, each groove 132 and run-out region 172 are formed by machining the substrate 110 through the fugitive coating 30. Example machining techniques are discussed above. As indicated in FIGS. 15 and 16, the component fabrication method further includes removing the fugitive coating 30 prior to disposing the coating 150 over the outer surface 112 of the substrate 110. Depending on the specific materials and processes, the fugitive coating 30 may be removed using mechanical (for example, polishing) or chemical (for example, dissolution in a solvent) means or using a combination thereof.

The use of fugitive coating 30 is described in commonly assigned, U.S. patent application Ser. No. 12/943,563, Ronald S. Bunker et al., "Method of fabricating a component using a fugitive coating," which is incorporated by reference herein in its entirety. As discussed in U.S. patent application Ser. No. 12/943,563, for particular configurations, the thickness of the fugitive coating 30 deposited on the surface 112 of the substrate 110 is in a range of 0.5-2.0 millimeters. In one non-limiting example, the fugitive coating 30 comprises a one millimeter thick polymer based coating. The fugitive coating 30 may be deposited using a variety of deposition techniques, including powder coating, electrostatic coating, dip-coating, spin coating, chemical vapor deposition and application of a prepared tape. More particularly, the fugitive coating is essentially uniform and is able to adhere, but does not harm the substrate base metal.

For particular process configurations, the fugitive coating 30 is deposited using powder coating or electrostatic coating. For example process configurations, the fugitive coating 30 comprises a polymer. For example, the fugitive coating 30 may comprise a polymer based coating, such as pyridine, which may be deposited using chemical vapor deposition. Other example polymer based coating materials include resins, such as polyester or epoxies. Example resins include photo-curable resins, such as a light curable or UV curable resin, non-limiting examples of which include a UV/Visible light curable masking resin, marketed under the trademark Speedmask 729® by DYMAX, having a place of business in Torrington, Conn., in which case, the method further includes curing the photo-curable resin 30, prior to forming the grooves 132. For other process configurations, the fugitive coating 30 may comprise a carbonaceous material. For example, the fugitive coating 30 may comprise graphite paint. Polyethylene is yet another example coating material. For other process configurations, the fugitive coating 30 may be enameled onto the surface 112 of the substrate 110.

In addition, for the example process shown in FIGS. 14 and 15, the component fabrication method further includes filling each groove 132 and each run-out region 172 with a sacrificial filler 32 prior to removing the fugitive coating 30. For example, the filler may be applied by slurry, dip coating or spray coating the component 100 with a metallic slurry "ink" 32, such that the grooves 132 are filled. For other configurations, the filler 32 may be applied using a micro-pen or syringe. For certain implementations, the grooves 132 may be over-filled with the filler material 32. Excess filler 32 may be removed, for example may be wiped off, such that the grooves 132 and run-out regions 172 are "seen." Non-limiting example materials for the filler 32 include photo-curable resins (for example, visible or UV curable resins), ceramics, copper or molybdenum inks with an organic solvent carrier, and graphite powder with a water base and a carrier. More generally, the filler 32 may comprise the particles of interest suspended in a carrier with an optional binder. Further, depending on the type of filler employed, the filler may or may not flow into the access holes 140. Example filler materials (or channel filling means or sacrificial materials) are discussed in commonly assigned, U.S. Pat. No. 5,640,767 and in commonly assigned, U.S. Pat. No. 6,321,449, which are incorporated by reference herein in their entirety. For particular process configurations, a low strength metallic slurry "ink" is used for the filler. The use of a low strength ink beneficially facilitates subsequent polishing. In addition, for certain process configurations, the filler is filled above the channel height due to the first fugitive coating thickness, such that the filler will cure down to the desired height or a bit taller.

For the process illustrated by FIGS. 15-16, the component fabrication method further includes removing the sacrificial filler 32 from each groove 132 and from each run-out region 172 after disposing the coating 150 over the outer surface 112 of the substrate 110. For example, the filler 32 may be leached out of the channels 130 using a chemical leaching process. As discussed in U.S. Pat. No. 5,640,767, the filler (or channel filling means) may be removed by melting/extraction, pyrolysis, or etching, for example. Similarly, the filler materials (sacrificial materials) discussed in U.S. Pat. No. 6,321,449 may be removed by dissolution in water, alcohol, acetone, sodium hydroxide, potassium hydroxide or nitric acid.

In addition to the process steps described here with reference to FIGS. 11-16, several additional optional process steps are disclosed in U.S. patent application Ser. No. 12/943,563. For example and as discussed in U.S. patent application Ser. No. 12/943,563, for particular process configurations, the component fabrication method further includes curing the fugitive coating 30 prior to machining the substrate 110. It should also be noted that although the illustrated technique employs a sacrificial filler, for other process configurations, the sacrificial filler may be omitted, for example for re-entrant shaped or narrow grooves.

Beneficially, as explained in U.S. patent application Ser. No. 12/943,563, the fugitive coating 30 acts as the machining mask for formation of the channels. This mask leads to the desired sharp channel edges. Thus, the presence of the fugitive coating during the machining operations to form the grooves 132 and run-out regions 172 facilitates the formation of cooling channels 130 with the requisite sharp, well defined edges at the coating interface. This is the single most critical region in the cooling concept, and the above described fabrication process achieves the desired outcome with less precision of machining and less intricacy of filling than would be required without the use of a fugitive coating.

Figure 17:
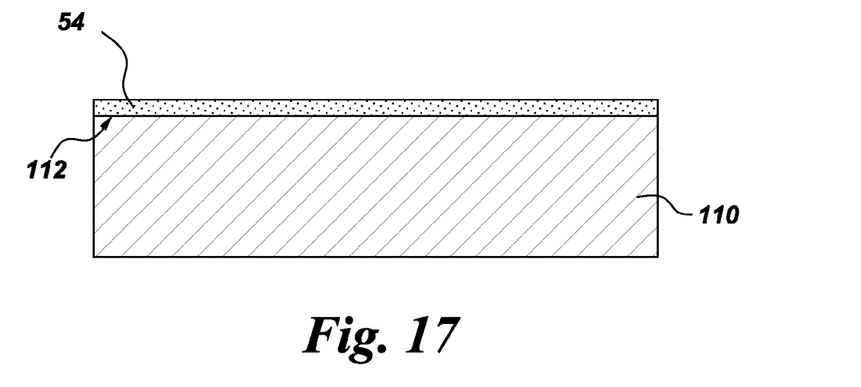
FIGS. 17-19 schematically illustrate a method of forming the channels and the run-out regions using two structural coating layers.
Figure 18:
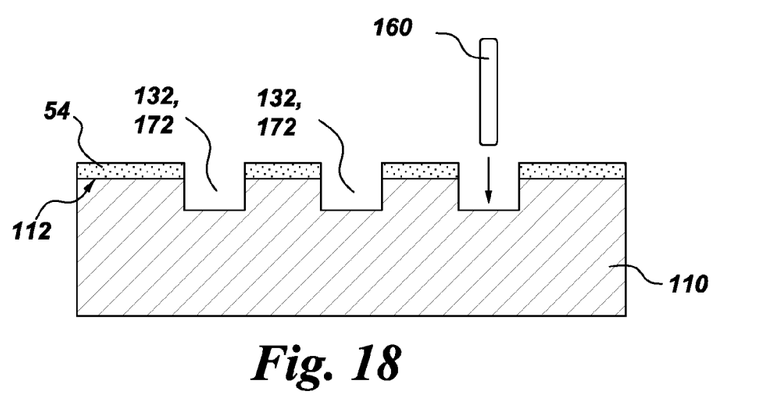

FIGS. 17-19 schematically illustrate a method of forming the channels 130 and the run-out regions 172 using two structural coating layers. As indicated, for example in FIG. 17, the component fabrication method further includes depositing a first layer of a structural coating 54 on the outer surface 112 of the substrate 110 prior to forming the groove(s) 132. Example structural coatings are provided in U.S. Pat. No. 5,640,767 and U.S. Pat. No. 5,626,462, which are incorporated by reference herein in their entirety, and suitable coating materials are discussed in more detail below. Suitable techniques for depositing the first layer of the structural coating are described below. As indicated, for example in FIG. 18, each groove 132 and run-out region 172 are formed by machining the substrate 110 through the first layer of the structural coating 54. For this arrangement, the coating 150 comprises a second layer of the structural coating, as indicated in FIG. 19. It should be noted that there are several steps (not expressly shown) between those shown in FIGS. 18 and 19. Namely, the access holes 142 are formed, and the grooves 132 are filled with a sacrificial filler 32 prior to deposition of the second structural coating layer 150. Further, although the illustrated technique employs a sacrificial filler, for other process configurations, the sacrificial filler may be omitted, for example for re-entrant shaped or narrow grooves.

The use of two structural coating layers is described in commonly assigned U.S. patent application Ser. No. 12/966,101, Ronald S. Bunker et al., "Method of fabricating a component using a two-layer structural coating," which is incorporated by reference herein in its entirety. As discussed in U.S. patent application Ser. No. 12/966,101, for particular configurations, the first and/or second structural coating layers 54, 150 may have a thickness in the range of 0.02-2.0 millimeters, and more particularly, in the range of 0.1 to 1 millimeters, and still more particularly 0.1 to 0.5 millimeters for industrial gas turbine components. For aviation components, this range is typically 0.02 to 0.25 millimeters, and more particularly 0.05 to 0.125 millimeters. However, other thicknesses may be utilised depending on the requirements for a particular component 100. As discussed in U.S. patent application Ser. No. 12/966,101, for particular process concepts, the component fabrication method further includes performing a heat treatment after depositing the first layer 54 of the structural coating. Additional heat treatments may be performed after the deposition of the second layer 150 of the structural coating and/or after deposition of additional coating layers. For example, in the case of a metallic coating, the coated component 100 may be heated to a temperature in a range of about 0.7-0.9 Tm after the deposition of the second structural coating layer 150, where Tm is the melting temperature of the coating in degrees Kelvin. Beneficially, this heat treatment promotes the interdiffusion and subsequent adhesion of the two layers 54, 150 of the structural coating to one another, thereby reducing the likelihood of interfacial flaws at the channel edges.

Referring now to FIG. 19, as discussed in U.S. patent application Ser. No. 12/966,101, the integrity of the interfacial region between the structural coating 54, 150 and the underlying substrate material at the upper edges of the cooling channels is critical to the durability of the cooling channels. Beneficially, using the two structural coating layers improves the matching of material properties and microstructure at the critical channel interfacial region. This enhances the bond between the coatings and the substrate, thereby enhancing the durability of the cooling channels.

Beneficially, the above-described methods provide for the processing of film holes as discrete elements with ease of locating and formation. In addition, the above-described methods do not rely exclusively on the coating thickness to define the film holes and thus overcome certain typical practice limitation associated with a minimum L/D, where L and D are the length and diameter of the film hole. Further, the above-described methods provide economical means for forming film holes, as the final formation of the film holes is accomplished by application of an abrasive liquid jet.

A component 100 is described with reference to FIGS. 2-8, 11, and 16-20. As indicated, for example, in FIG. 3, the component 100 includes a substrate 110 comprising an outer surface 112 and an inner surface 116. The substrate 110 is described above. As indicated, for example, in FIGS. 3 and 20, the outer surface 112 defines one or more grooves 132 and one or more run-out regions 172. For the example configuration shown in FIG. 20, the outer surface 112 of the substrate 110 further defines one or more additional run-out regions 172 for each groove 132. Beneficially, multiple run-out region configurations, such as that shown in FIG. 20 may conveniently be located and formed off of any cooling channel, with the local orientation as desired, and exit shaping to provide enhanced film effectiveness.

As indicated, for example in FIG. 4, each groove 132 extends at least partially along the outer surface 112 of the substrate 110 and has a base 134 and a discharge end 170, and each run-out region 172 is adjacent to the discharge end 170 for a respective groove 132. As indicated, for example in FIG. 6, a coating 150 is disposed over at least a portion of the outer surface 112 of the substrate 110, such that the groove(s) 132 and the coating 150 together define one or more channels 130 for cooling the component 100.

As discussed in U.S. Pat. No. 5,626,462, the material used to form coating 150 comprises any suitable material. For the case of a cooled turbine component 100, the structural coating material must be capable of withstanding temperatures up to about 1150° C., while the thermal barrier coat (TBC) can withstand temperatures up to about 1425° C. The structural coating must be compatible with and adapted to be bonded to the airfoil-shaped outer surface 112 of substrate 110, as discussed in U.S. patent application Ser. No. 12/943,563, Bunker et al. "Method of fabricating a component using a fugitive coating."

As discussed in U.S. Pat. No. 5,626,462, where the substrate material is a Ni-base superalloy containing both γ and γ' phases, the material for the structural coating may comprise similar compositions of materials to the substrate. Such a combination of coating and substrate 110 materials is preferred for particular applications, such as where the maximum temperatures of the operating environment (that is, the gas temperatures) are similar to those of existing engines (e.g. below 1650° C.) In the case where the substrate material is a Nb-base alloy, NiAl-based intermetallic alloy, or TiAl-based intermetallic alloy, the structural coating may likewise comprise similar material compositions.

As discussed in U.S. Pat. No. 5,626,462, for other applications, such as applications that impose temperature, environmental or other constraints that make the use of a monolithic metallic or intermetallic alloy coating inadequate, it is preferred that the structural coating comprise composites. The composites can consist of a mixture of intermetallic and metal alloy phases or a mixture of intermetallic phases. The metal alloy may be the same alloy as used for the substrate 110 or a different material, depending on the requirements of the component 100. Further, the two constituent phases must be chemically compatible, as discussed in U.S. patent application Ser. No. 12/943,563, Bunker et al. It is also noted that within a given coating, multiple composites may also be used, and such composites are not limited to two-material or two-phase combinations. Additional details regarding example structural coating materials are provided in U.S. Pat. No. 5,626,462.

Figure 2:
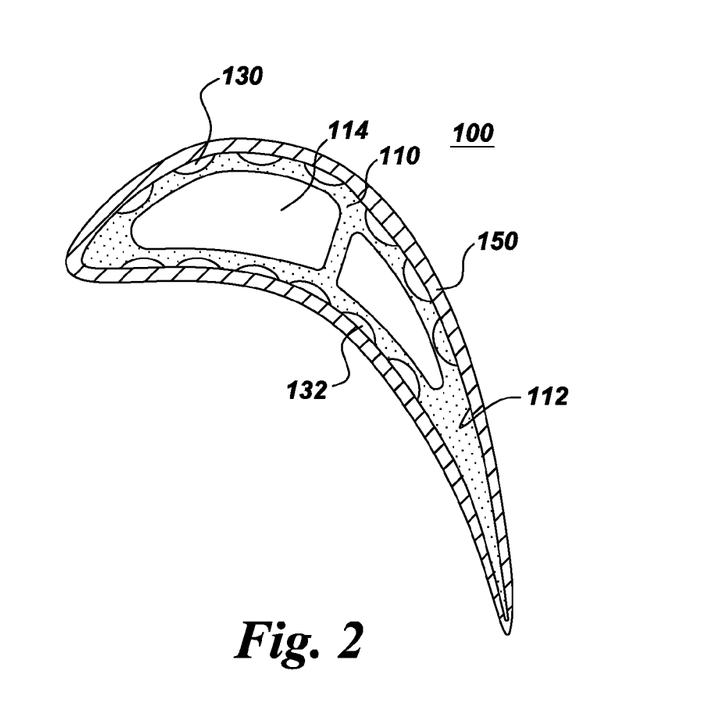
FIG. 2 is a schematic cross-section of an example airfoil configuration with cooling micro-channels, in accordance with aspects of the present invention.

For the example arrangement shown in FIG. 2, the inner surface 116 of the substrate 110 defines at least one hollow, interior space 114. As indicated, for example, in FIG. 3, one or more access holes 140 extend through the base 134 of respective grooves 132 to place the groove 132 in fluid communication with the hollow interior space(s) 114, as indicated for example in FIGS. 2 and 16. The access holes 140 described above.

The run-out regions 172 may have a variety of geometries and dimensions, depending on the application. As discussed above, for particular arrangements, the run-out regions 172 are designed to be sufficiently wide, so that the coating 150 does not bridge the run-out regions 172. For the example arrangements shown in top view in FIGS. 7 and 8, the run-out region (indicated by footprint 176 in FIGS. 7 and 8) is wider than the respective groove (indicated by channel 130 in FIGS. 7 and 8). For the example configuration shown in FIG. 5, the coating 150 does not bridge the run-out region 172, such that the run-out region 172 forms a film hole (indicated by reference numeral 174 in FIG. 6) for the respective groove 132. The film holes 174 may be round or non-circular shaped holes.

The grooves 132 may have a variety of geometries and dimensions. As discussed above, for particular configurations, the base 134 of each groove is wider than the top 136, such that each groove 132 comprises a re-entrant shaped groove 132. As discussed in U.S. patent application Ser. No. 12/943,624, with reference to FIGS. 7 and 11 thereof and as discussed in greater detail below, for certain configurations, the coating 150 completely bridges the respective grooves 132, such that the coating 150 seals the respective cooling channels 130. For other arrangements, the coating 150 defines one or more porous gaps (also termed "permeable slots"), for example, porosity in the coating 150 or a gap in the coating, such that the coating 150 does not completely bridge each of the respective grooves 132. Typically the permeable slots (porous gaps) have irregular geometries, with the width of the gap varying, as the structural coating is applied and builds up a thickness. As the first layer of the structural coating is applied to the substrate 110, the width of the gap may narrow from approximately the width of the top 136 of the channel 130, as the structural coating is built up. For particular examples, the width of gap, at its narrowest point, is 5% to 20% of the width of the respective channel top 136. In addition, the permeable slot may be porous, in which case the "porous" gap may have some connections, that is, some spots or localities that have zero gap. Depending on their specific function, the permeable slots, may extend either (1) through all of the coating layers or (2) through some but not all coatings, for example, a permeable slot may be formed in one or more coating layers with a subsequently deposited layer bridging the slots, thereby effectively sealing the slots. The permeable slots are discussed in U.S. patent application Ser. No. 12/943,624 and in U.S. patent application Ser. No. 12/966,101. Beneficially the slots provide stress relief for the coating 150. In addition, the permeable slot can serve as a cooling means when it extends through all coatings, that is, for this configuration, the permeable slots are configured to convey a coolant fluid from the respective channels 130 to an exterior surface of the component. Further, the permeable slot can serve as a passive cooling means when bridged by the upper coatings, in the case when those coatings are damaged or spalled.

For certain arrangements, the grooves 132 are re-entrant shaped, and the run-out regions 172 are not re-entrant shaped. For the arrangement shown in FIG. 7, the run-out region 172 is wider than the top 136 of the respective groove 132. For particular configurations, the coating 150 does not bridge the run-out region(s) 172, such that each run-out region 172 forms a film hole 174 (FIG. 6) for the respective groove 132.

The orientation of the run-out regions 172 relative to the grooves may vary depending on the application. For the arrangements indicated in FIGS. 7 and 8, each run-out region 172 is collinear with the respective groove 132. For the configuration shown in FIG. 3, each run-out region 172 is oriented at an angle α relative to the respective groove 132. In addition, the geometry of the run-out regions 172 may vary depending on the application.

Figure 7:
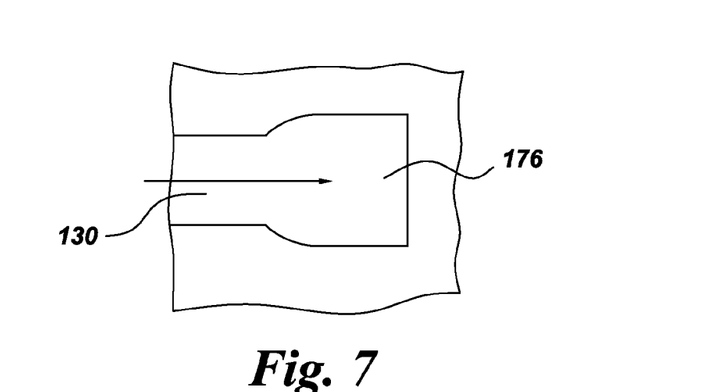
FIG. 7 is a top view of an example run-out region, which is wider than the respective groove.
Figure 8:
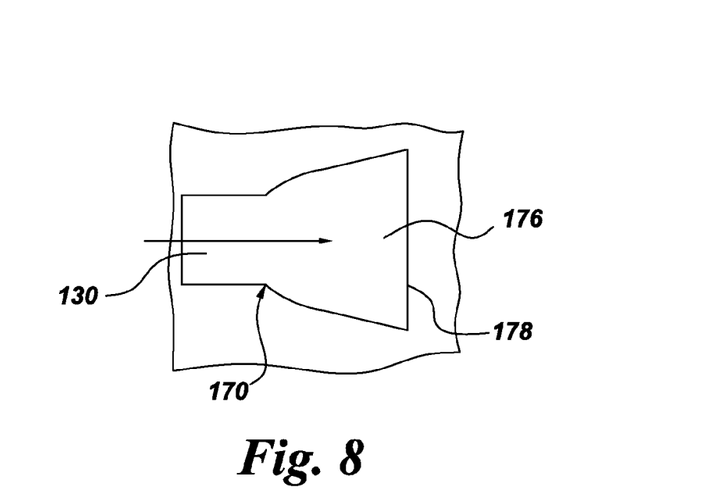
FIG. 8 is a top view of an example diffuser-shaped run-out region, which is wider than the respective groove.

As indicated in FIGS. 7 and 8, the footprint 176 of the run-out region 172 may vary based on the application. For the example configuration shown in FIG. 8, the footprint 176 of each run-out region 172 is narrower at the discharge end 170 for the respective groove 132 and wider at an opposite end 178 of the run-out region 172, such that the run-out region 172 forms a diffuser film hole 174.

As discussed above with reference to FIGS. 17-19, for particular configurations, the coating comprises at least a first and a second layer of a structural coating 54, 56. As indicated for example in FIGS. 18 and 19, the first structural coating layer 54 does not extend over the groove(s) 132 nor over the run-out region(s) 172. As indicated for example in FIG. 19, the second structural coating layer 56 is disposed over the first layer of the structural coating 54 and extends over the groove(s) 132, such that the groove(s) 132 and the second layer of the structural coating 56 together define the cooling channel(s) 130.

Beneficially, the above described methods and components facilitate the economical formation of film holes for allowing coolant to exit respective cooling channels. Further, the above-described techniques overcome certain typical design practice limitations on the L/D ratio (where L and D are the length of the film hole, respectively) that would arise in the present case (namely forming film holes for cooling channels 130, as opposed to forming film holes that extend through the substrate 110 through to the interior 114) as a result of the finite total thickness of the coating relative to the desired film hole size. Desirably, the above-described techniques overcome this limitation by the formation of run-out regions.

Although only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A method of manufacturing a component, the method comprising:
   forming one or more grooves in an outer surface of a substrate, wherein each of the one or more grooves extends at least partially along the surface of the substrate and has a base, a top and at least one discharge end;
   forming a run-out region adjacent to the discharge end of each of the one or more grooves, such that at least one run-out region is formed for each groove, and such that each run-out region extends away from the discharge end of the respective groove, wherein the run-out region for one of the one or more grooves is wider than the groove; and
   disposing a coating over at least a portion of the surface of the substrate, wherein the one or more grooves and the coating define one or more channels for cooling the component, wherein the coating does not bridge the one or more run-out regions, such that each of the one or more run-out regions forms a film hole for the respective one of the one or more grooves.

2. The method of claim 1, further comprising casting the substrate prior to forming the one or more grooves and run-out regions in the surface of the substrate.

3. The method of claim 1, wherein each of the one or more grooves is formed by directing an abrasive liquid jet at the outer surface of the substrate, and wherein each of the one or more run-out regions is formed using the abrasive liquid jet.

4. The method of claim 3, wherein each of the one or more run-out regions is formed by lifting the abrasive liquid jet from the outer surface of the substrate, such that each of the one or more run-out regions is tapered.

5. The method of claim 1, wherein the substrate has at least one hollow interior space, the method further comprising forming one or more access holes, wherein each access hole is formed through the base of a respective groove, to connect the groove in fluid communication with the respective hollow interior space.

6. The method of claim 1, wherein a portion of the coating is deposited in each of the one or more run-out regions, the method further comprising removing at least a portion of the coating deposited in each of the one or more run-out regions, such that each of the one or more run-out regions forms a film hole for the respective one of the one or more grooves.

7. The method of claim 1, further comprising:
   depositing a fugitive coating on the outer surface of the substrate prior to forming the one or more grooves, wherein each groove and run-out region are formed by machining the substrate through the fugitive coating; and
   removing the fugitive coating prior to disposing the coating over the outer surface of the substrate.

8. The method of claim 7, further comprising:
   filling each groove and each run-out region with a sacrificial filler prior to removing the fugitive coating; and
   removing the sacrificial filler from each groove and from each run-out region after disposing the coating over the outer surface of the substrate.

9. The method of claim 1, wherein the coating comprises an outer layer of a structural coating, the method further comprising depositing an inner layer of the structural coating on the outer surface of the substrate prior to forming the one or more grooves, wherein each groove and run-out region are formed by machining the substrate through the inner layer of the structural coating.

10. The method of claim 1, further comprising forming one or more additional run-out regions at respective discharges points for at least one groove.

11. A method of manufacturing a component, the method comprising:
    forming one or more grooves in an outer surface of a substrate, wherein each of the one or more grooves extends at least partially along the surface of the substrate and has a base, a top and at least one discharge end;
    forming a run-out region adjacent to the discharge end of each of the one or more grooves, such that at least one run-out region is formed for each groove, and such that each run-out region extends away from the discharge end of the respective groove; and
    disposing a coating over at least a portion of the surface of the substrate, wherein the one or more grooves and the coating define one or more channels for cooling the component,
wherein the base of each of the one or more grooves is wider than the top of the groove, such that the groove comprises a re-entrant shaped groove, wherein no run-out region is re-entrant shaped, wherein each of the one or more run-out regions is wider than the top of the respective groove, and wherein the coating does not bridge the one or more run-out regions, such that each of the one or more run-out regions forms a film hole for the respective groove.

12. The method of claim 11, wherein a portion of the coating is deposited in each of the one or more run-out regions, the method further comprising removing at least a portion of the coating deposited in each of the one or more run-out regions to form the film hole for the respective one of the one or more grooves.

13. A method of manufacturing a component, the method comprising:
    forming one or more grooves in an outer surface of a substrate, wherein each of the one or more grooves extends at least partially along the surface of the substrate and has a base, a top and at least one discharge end;
    forming a run-out region adjacent to the discharge end of each of the one or more grooves, such that at least one run-out region is formed for each groove, and such that each run-out region extends away from the discharge end of the respective groove;
    disposing a coating over at least a portion of the surface of the substrate, wherein the one or more grooves and the coating define one or more channels for cooling the component, wherein a portion of the coating is deposited in each of the one or more run-out regions; and
    removing at least a portion of the coating deposited in each of the one or more run-out regions, such that each of the one or more run-out regions forms a film hole for the respective one of the one or more grooves.

14. The method of claim 13, further comprising casting the substrate prior to forming the one or more grooves and run-out regions in the surface of the substrate.

15. The method of claim 13, wherein each of the one or more grooves is formed by directing an abrasive liquid jet at the outer surface of the substrate, and wherein each of the one or more run-out regions is formed using the abrasive liquid jet.

16. The method of claim 15, wherein each of the one or more run-out regions is formed by lifting the abrasive liquid jet from the outer surface of the substrate, such that each of the one or more run-out regions is tapered.

17. The method of claim 13, wherein the substrate has at least one hollow interior space, the method further comprising forming one or more access holes, wherein each access hole is formed through the base of a respective groove, to connect the groove in fluid communication with the respective hollow interior space.

18. The method of claim 13, further comprising:
    depositing a fugitive coating on the outer surface of the substrate prior to forming the one or more grooves, wherein each groove and run-out region are formed by machining the substrate through the fugitive coating; and
    removing the fugitive coating prior to disposing the coating over the outer surface of the substrate.

19. The method of claim 18, further comprising:
    filling each groove and each run-out region with a sacrificial filler prior to removing the fugitive coating; and
    removing the sacrificial filler from each groove and from each run-out region after disposing the coating over the outer surface of the substrate.

20. The method of claim 13, wherein the coating comprises an outer layer of a structural coating, the method further comprising depositing an inner layer of the structural coating on the outer surface of the substrate prior to forming the one or more grooves, wherein each groove and run-out region are formed by machining the substrate through the inner layer of the structural coating.

21. The method of claim 13, further comprising forming one or more additional run-out regions at the discharges end of at least one of the one or more grooves.

22. A method of manufacturing a component, the method comprising:
    forming one or more grooves in an outer surface of a substrate, wherein each of the one or more grooves extends at least partially along the surface of the substrate and has a base, a top and at least one discharge end;
    forming a run-out region adjacent to the discharge end of each of the one or more grooves, such that at least one run-out region is formed for each groove, and such that each run-out region extends away from the discharge end of the respective groove; and
    disposing a coating over at least a portion of the surface of the substrate, wherein the one or more grooves and the coating define one or more channels for cooling the component,
wherein a footprint of each of the one or more run-out regions is narrower at the discharge end for the respective one of the one or more grooves and wider at an opposite end of the run-out region, such that the run-out region forms a diffuser film hole.

* * * * *